(12) United States Patent
Iwashita et al.

(10) Patent No.: US 12,153,171 B2
(45) Date of Patent: Nov. 26, 2024

(54) NUCLEAR REACTION DETECTION DEVICE, METHOD AND PROGRAM

(71) Applicant: Nippon Telegraph and Telephone Corporation, Tokyo (JP)

(72) Inventors: Hidenori Iwashita, Musashino (JP); Yuichiro Okugawa, Musashino (JP); Yoshiharu Hiroshima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 256 days.

(21) Appl. No.: 17/920,852

(22) PCT Filed: May 12, 2020

(86) PCT No.: PCT/JP2020/018950
§ 371 (c)(1),
(2) Date: Oct. 24, 2022

(87) PCT Pub. No.: WO2021/229678
PCT Pub. Date: Nov. 18, 2021

(65) Prior Publication Data
US 2023/0204800 A1    Jun. 29, 2023

(51) Int. Cl.
*G01T 1/17* (2006.01)
(52) U.S. Cl.
CPC ....................... *G01T 1/17* (2013.01)
(58) Field of Classification Search
None
See application file for complete search history.

(56) References Cited

U.S. PATENT DOCUMENTS

| 7,859,292 | B1 * | 12/2010 | Shuler, Jr. | .......... | H03K 19/0033 |
| | | | | | 326/46 |
| 2008/0281572 | A1 * | 11/2008 | Puri | ........................ | G06F 30/20 |
| | | | | | 703/16 |
| 2011/0186940 | A1 * | 8/2011 | Randazzo | ................. | G01T 3/08 |
| | | | | | 257/E29.166 |

(Continued)

OTHER PUBLICATIONS

"Neutron cross-section of N-modular redundancy technique in SRAM-based FPGAs," J. Tarrillo, F. L. Kastensmidt, P. Rech, C. Frost and C. Valderrama, IEEE Transactions on Nuclear Science, vol. 61, No. 4, Aug. 2014 (Year: 2014).*

(Continued)

*Primary Examiner* — Marcus H Taningco
(74) *Attorney, Agent, or Firm* — Fish & Richardson P.C.

(57) ABSTRACT

A nuclear reaction detection device has a detection circuit section (123) that detects an SEF that is an error causing a logical abnormality in an FPGA (100), and a CRAM monitoring circuit 102 and a number-of-errors determination unit 130 that detect a bit error occurring in the FPGA (100) and further determine whether the bit error is an SBU that is an error of one bit or an MBU that is an error of multiple bits. The nuclear reaction detection device further includes an SBU cross-section calculation section (231) that detects the energy of a particle that has caused an SEF, and calculates an SBU cross-section based on the energy and a total number of SBUs that have occurred in the FPGA (100), and an MBU cross-section calculation section (232) that calculates an MBU cross-section based on the energy and a total number of MBUs that have occurred in the FPGA (100).

6 Claims, 9 Drawing Sheets

(56) References Cited

U.S. PATENT DOCUMENTS

| | | | | |
|---|---|---|---|---|
| 2014/0203836 | A1* | 7/2014 | Miller | G01R 31/30 |
| | | | | 324/762.01 |
| 2015/0364216 | A1* | 12/2015 | Buck | G11C 7/02 |
| | | | | 250/394 |
| 2022/0260735 | A1* | 8/2022 | Iwashita | G01T 1/245 |

OTHER PUBLICATIONS

Ibe, "Terrestrial Radiation Effects in ULSI Devices and Electronic Systems," John Wiley & Sons, Singapore Pte. Ldt., pp. 84-105, 24 pages.

* cited by examiner (a)

n-TH CRAM CHECK

| ADDRESS | NUMBER OF ERRORS |
|---|---|
| 0x00000010 | SBU |
| 0x00023000 | MBU |
| 0x00100340 | SBU |
| 0x09029600 | MBU |
| | |

(b)

n+1-TH CRAM CHECK

| ADDRESS | NUMBER OF ERRORS |
|---|---|
| 0x00000010 | SBU |
| 0x00023000 | MBU |
| 0x00100340 | SBU |
| 0x09029600 | MBU |
| | |

ERROR IS DETECTED BY MEMORY MONITORING CIRCUIT UNIT OF USER CIRCUIT IN n+1-TH CHECK (c)

n+2-TH CRAM CHECK

| ADDRESS | NUMBER OF ERRORS | |
|---|---|---|
| 0x00000010 | SBU | |
| 0x00023000 | MBU | |
| 0x00080340 | MBU | — Z1 |
| 0x00100340 | SBU | |
| 0x09029600 | MBU | |

(a)

n-TH CRAM CHECK

| ADDRESS | NUMBER OF ERRORS |
|---|---|
|  |  |
|  |  |
|  |  |
|  |  |
|  |  |

(b)

n+1-TH CRAM CHECK

| ADDRESS | NUMBER OF ERRORS |
|---|---|
|  |  |
|  |  |
|  |  |
|  |  |
|  |  |

ERROR IS DETECTED BY MEMORY MONITORING CIRCUIT UNIT OF USER CIRCUIT IN n+1-TH CHECK (c)

n+2-TH CRAM CHECK

| ADDRESS | NUMBER OF ERRORS |  |
|---|---|---|
| 0x00080340 | MBU | ~Z2 |
|  |  |  |
|  |  |  |
|  |  |  |
|  |  |  |

NUCLEAR REACTION DETECTION DEVICE, METHOD AND PROGRAM

CROSS-REFERENCE TO RELATED APPLICATIONS

This application is a National Stage application under 35 U.S.C. § 371 of International Application No. PCT/JP2020/018950, having an International Filing Date of May 12, 2020. The disclosure of the prior application is considered part of the disclosure of this application, and is incorporated by reference in its entirety into this application.

TECHNICAL FIELD

The present invention relates to a nuclear reaction detection device, a nuclear reaction detection method, and a nuclear reaction detection program that determine the energy of a particle beam and measure a cross-section occurring in a CRAM due to the energy of the particle beam.

BACKGROUND ART

A technology has been proposed that measures a single-event upset (SEU) cross-section by emitting particle radiation with specific energy (e.g., see Non-Patent Literature 1). The "SEU," also called "soft error," refers to a phenomenon in which a single particle (a neutron, a proton, a baryon, or the like) enters an LSI, such as a memory, and an electric charge produced by means of a nuclear reaction causes data (bits) stored in the LSI to be inverted.

Using a field-programmable gate array (FPGA) formed by a configuration random-access memory (CRAM), in the event that an SEU occurs in the FPGA, the technology detects a change in a logic circuit that has been designed in the FPGA in advance and the resulting malfunction, and can thereby detect the SEU with accuracy in the order of a few nanoseconds (ns) (the order of the operation clock of the FPGA). Further, it is possible to measure the energy of a particle that has caused the SEU by means of a time-of-flight method, and to measure the SEU cross-section of that energy from the fluence of the radiated particle. The CRAM can be formed by a static random-access memory (SRAM).

An SEU cross-section is a measure to represent a rate at which a particle causes an SEU. When the number of SEUs that have occurred as a result of irradiating a semiconductor with a particle fluence $\phi$ [n/cm$^2$] (the total number of particles entering a unit area) is N, the SEU cross-section can be expressed by the following Formula (1):

$$(\text{SEU cross-section}) = N/\phi \quad (1)$$

CITATION LIST

Non-Patent Literature

Non-Patent Literature 1: Eishi H. Ibe, "Terrestrial Radiation Effects in ULSI Devices and Electronic Systems," pp. 84-105, John Wiley & Sons Singapore Pte. Ltd.

SUMMARY OF THE INVENTION

Technical Problem

However, the conventional technology uses only a logical abnormality of an FPGA caused by a bit error of a configuration RAM (CRAM) as a detection trigger. Therefore, it is not possible to identify whether an SEU having occurred due to particle radiation is a single-bit upset (SBU) in which only one bit is inverted or a multi-bit upset (MBU) in which multiple bits are inverted.

That is, conventionally, only a logical abnormality of an FPGA caused by a bit error of a CRAM is used as a detection trigger. Since a logical abnormality occurs regardless of an SBU or an MBU, these two may not be identified. Therefore, there has been a problem that an SBU cross-section and an MBU cross-section may not be calculated separately.

The present invention has been devised in view of the above problems, and an object of the present invention is to provide a nuclear reaction detection device, a nuclear reaction detection method, and a nuclear reaction detection program that can detect an SEU occurring in a CRAM, further distinguish whether the SEU is an SBU or an MBU, and calculate an SBU cross-section and an MBU cross-section separately.

Means for Solving the Problem

A nuclear reaction detection device of one aspect of the present invention is a nuclear reaction detection device having an FPGA, and includes: a detection circuit unit that detects a soft error failure (SEF) that is an error causing a logical abnormality in the FPGA; an error monitoring unit that detects a bit error occurring in the FPGA, and determines whether the bit error is an SBU that is an error of one bit or an MBU that is an error of multiple bits; an SBU cross-section calculation section that detects the energy of a particle that has caused the SEF, and calculates an SBU cross-section based on the energy and a total number of SBUs that have occurred in the FPGA; and an MBU cross-section calculation section that calculates an MBU cross-section based on the energy and a total number of MBUs that have occurred in the FPGA.

A nuclear reaction detection method of one aspect of the present invention is a nuclear reaction detection method performed by a nuclear reaction detection device having an FPGA, and includes the steps of: detecting an SEF that is an error causing a logical abnormality in the FPGA; detecting a bit error occurring in the FPGA, and determining whether the bit error is an SBU that is an error of one bit or an MBU that is an error of multiple bits; detecting the energy of a particle that has caused the SEF, and calculating an SBU cross-section based on the energy and a total number of SBUs that have occurred in the FPGA; and calculating an MBU cross-section based on the energy and a total number of MBUs that have occurred in the FPGA.

One aspect of the present invention is a nuclear reaction detection program that causes a computer to function as the nuclear reaction detection device.

Effects of the Invention

The present invention makes it possible to distinguish whether an SEU that is a soft error occurring in a CRAM is an SBU or an MBU and calculate an SBU cross-section and an MBU cross-section separately.

BRIEF DESCRIPTION OF DRAWINGS

FIG. 7(a) shows a result of the n-th detection, FIG. 7(b) shows a result of the n+1-th detection, and FIG. 7(c) shows a result of the n+2-th detection.

FIG. 8(a) shows a result of the n-th detection, FIG. 8(b) shows a result of the n+1-th detection, and FIG. 8(c) shows a result of the n+2-th detection.

DESCRIPTION OF EMBODIMENTS

Description of Configuration of Embodiment

Figure 1:
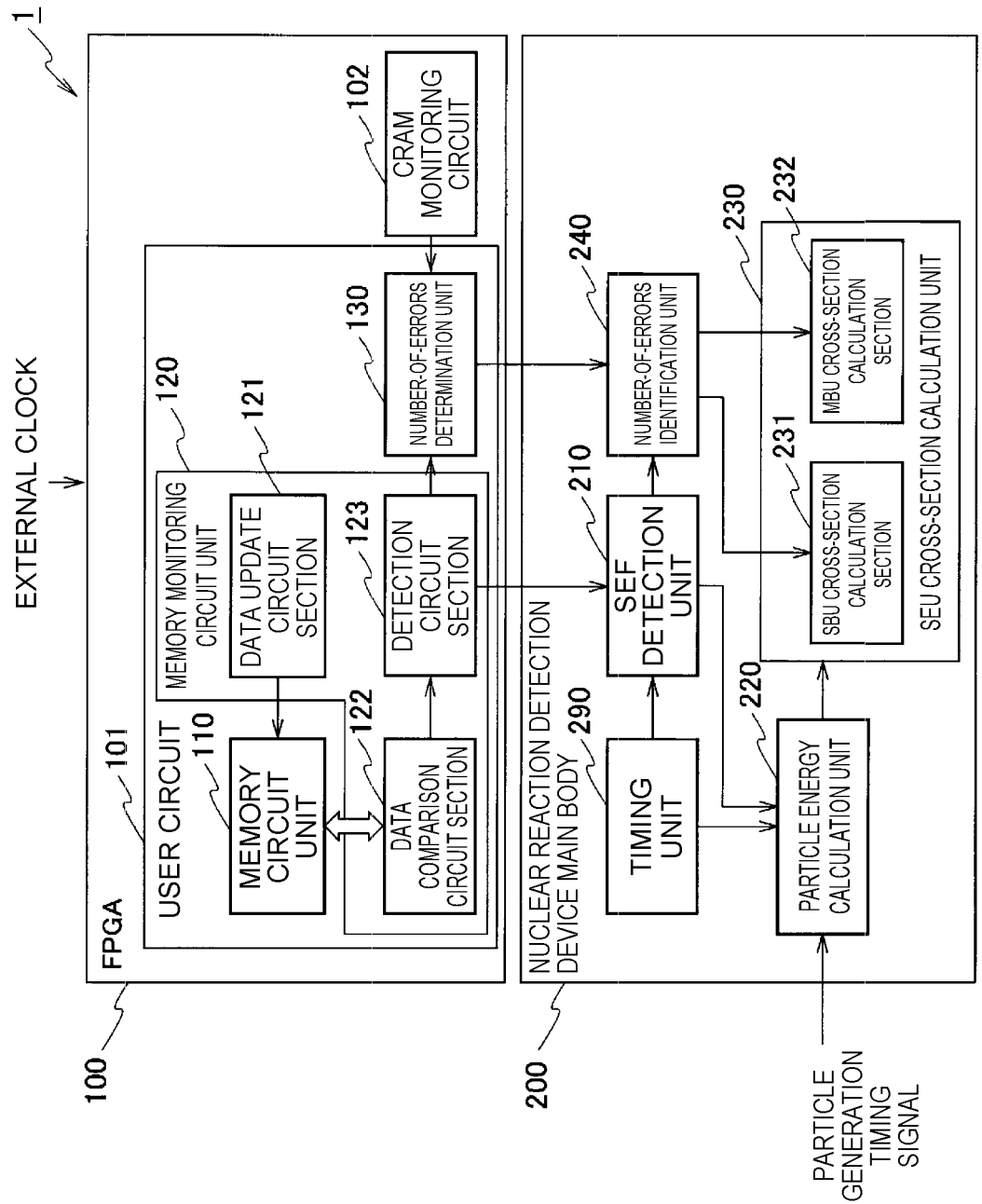
FIG. 1 is a block diagram showing the configuration of a nuclear reaction detection device according to one embodiment of the present invention.
Figure 2:
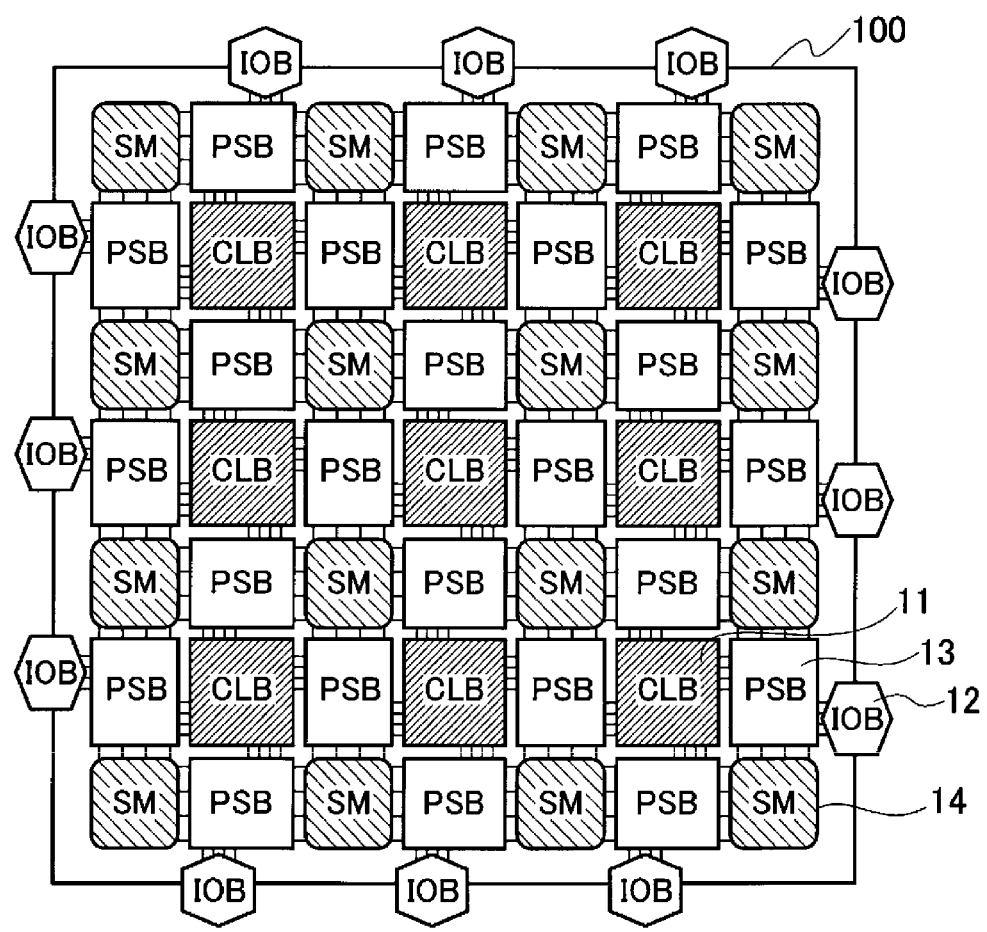
FIG. 2 is an illustration showing the configuration of an FPGA installed in the nuclear reaction detection device according to one embodiment of the present invention.

An embodiment of the present invention will be described below with reference to the drawings. FIG. 1 is a block diagram showing the configuration of a nuclear reaction detection device 1 according to one embodiment of the present invention. FIG. 2 is an illustration showing a semiconductor circuit forming an FPGA 100 shown in FIG. 1.

In this embodiment, a soft error (an "SEF" which will be described later) that occurs in a semiconductor device, such as an LSI, due to an SEU is detected in the order of nanoseconds. Based on the detection result, the energy of a particle (a neutron, a proton, a baryon, or the like) that has caused the SEU is measured by means of a technique such as a time-of-flight method. Then, based on the fluence of radiated particles (the total number of particles entering a unit area), an SEU cross-section of the particle energy is measured, and moreover an SBU cross-section and an MBU cross-section are measured. Specifically, an SEU is detected by means of the FPGA 100 shown in FIG. 1, and further whether the detected SEU is an SBU or an MBU is determined. Thereafter, the SBU cross-section and the MBU cross-section are calculated by means of a nuclear reaction detection device main body 200.

As shown in FIG. 1, the nuclear reaction detection device 1 according to the present embodiment includes the FPGA 100 and the nuclear reaction detection device main body 200. The FPGA 100 is formed of an SRAM. More specifically, the FPGA 100 is implemented using a CRAM. The FPGA 100 has a user circuit 101 and a CRAM monitoring circuit 102. The FPGA 100 can be formed of a semiconductor circuit shown in FIG. 2, for example.

In the following, the specific circuit configuration of the FPGA 100 will be described with reference to the circuit diagram shown in FIG. 2. As shown in FIG. 2, the FPGA 100 includes configuration logic blocks (CLBs) 11, input-output blocks (IOBs) 12, programmable switch boxes (PSBs) 13, and switch matrices (SMs) 14. As described above, the FPGA 100 is implemented using a CRAM. However, the present invention is not limited thereto, and the FPGA 100 can also be formed of another semiconductor device.

Figure 3:
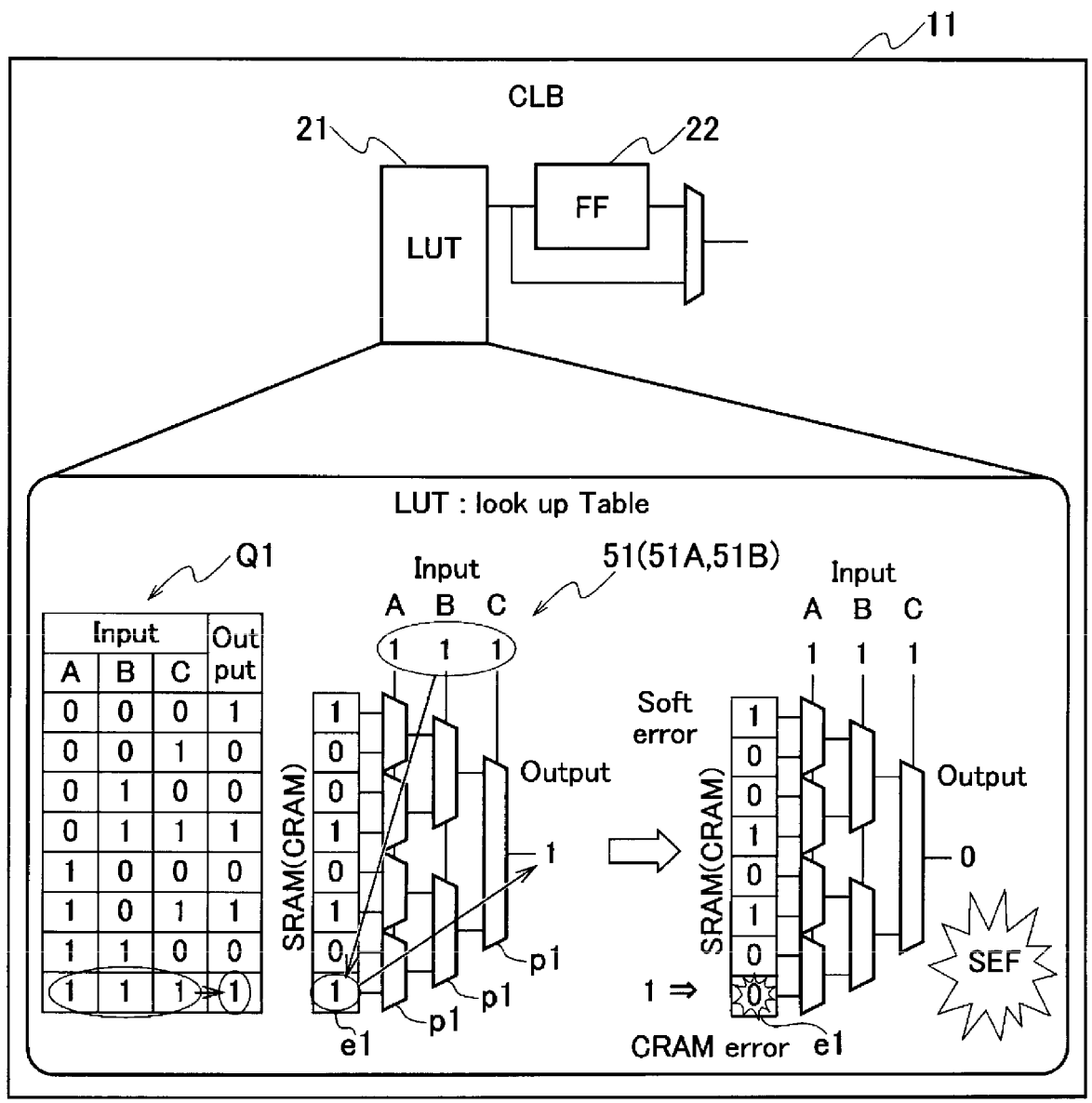
FIG. 3 is a circuit diagram showing a look-up table (LUT) built in a CLB formed by the FPGA.

The CLBs 11 are circuits forming various types of logic circuits. FIG. 3 is an illustration showing one example of the specific circuit configuration of the CLB 11. As shown in FIG. 3, the CLB 11 includes an LUT circuit 21 and an FF circuit 22. Details will be described later.

The IOBs 12 are circuits serving as interfaces with external devices, such as LEDs and various sensors. Data can be input from and output to external devices through the IOBs.

The PSBs 13 are circuits for coupling an output wire of one CLB 11 to another CLB 11.

Figure 4:
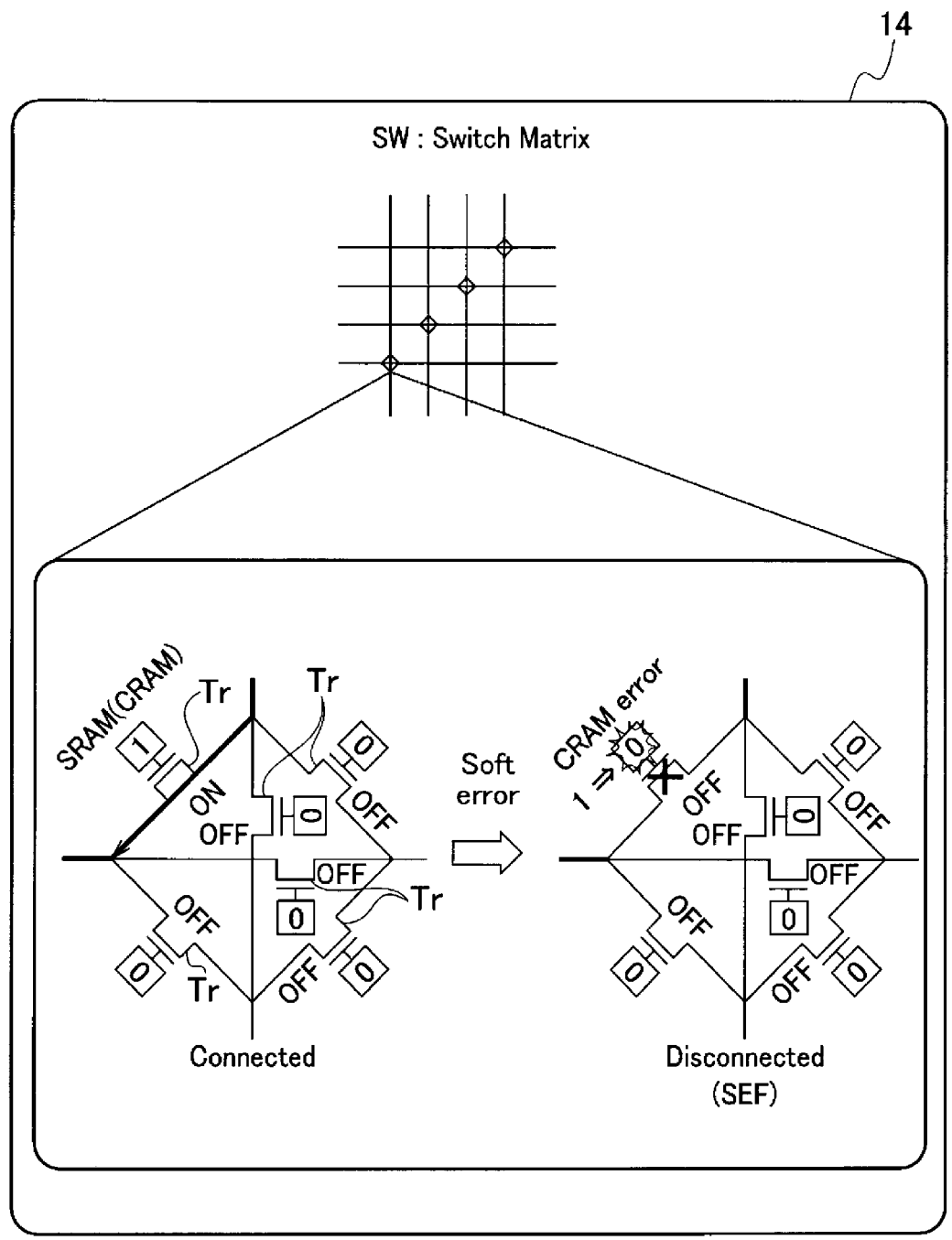
FIG. 4 is a circuit diagram showing a switch matrix (SM) formed by the FPGA.

The SMs 14 are circuits for outputting a signal output from the CLB 11 via the PSB 13 to another CLB. FIG. 4 is a circuit diagram showing the specific configuration of the SM 14.

As shown in FIG. 4, the SM 14 includes a matrix circuit formed of a plurality of pass-transistors Tr. By switching the pass-transistors Tr on and off, a wiring route can be arbitrarily set so as to switch the connection between the CLBs 11.

On and off of each pass-transistor Tr are controlled by means of a control signal given from outside. Alternatively on and off are controlled as the CLB 11 controls a switching control unit (not shown) that is provided separately from the aforementioned LUT circuit 21 and FF circuit 22. The pass-transistor Tr is turned off when "0" is received as a control signal, for example. The pass-transistor Tr is turned on when "1" is received as a control signal. When a bit error occurs in the CRAM forming the SM 14, the connection becomes different from a design intended by a user, which results in a logical abnormality.

Referring back to FIG. 1, the FPGA 100 includes the user circuit 101 and the CRAM monitoring circuit 102 by the circuit configuration shown in FIG. 2. The user circuit 101 includes a memory circuit unit 110, a memory monitoring circuit unit 120, and a number-of-errors determination unit 130 (error monitoring unit).

As described above, the memory circuit unit 110 is built by the CLB 11 that is formed of a CRAM. As shown in FIG. 3 as one example, the memory circuit unit 110 includes the look-up table circuit (LUT circuit 21) and the flip-flop circuit (FF circuit 22). The memory circuit unit 110 includes a plurality of circuits including the aforementioned LUT circuit 21 and FF circuit 22.

The LUT circuit 21 has a resistor 51 to which a plurality of (in FIG. 3, seven) multiplexer circuits p1 is connected.

Each multiplexer circuit p1 operates in accordance with a preset truth table Q1 based on data of select signals "A," "B," and "C." An output of the resistor 51 is selected as "0" or "1" according to the select signals "A," "B," and "C." Therefore, if the same select signal is input to the LUT circuits 21 set for two CLBs 11, outputs of the two resistors (which will be referred to as resistors 51A, 51B) become the same, for example. However, if an error due to an SEU occurs in the CRAM forming the LUT circuit 21, the circuit becomes different from a circuit designed by the user, thereby causing malfunction. Therefore, if the same select signal is input to the LUT circuits 21 set for two CLBs 11, an output of the resistor 51A and an output of the resistor 51B become different numerical values. Hereinafter, an error that causes a logical abnormality due to an SEU will be referred to as a soft error failure (SEF).

Referring back to FIG. 1, the memory monitoring circuit unit 120 includes a data update circuit section 121, a data comparison circuit section 122, and a detection circuit section 123. The memory monitoring circuit unit 120 monitors each piece of data included in the memory circuit unit 110 on the cycle of the operation clock of the FPGA 100.

The data update circuit section 121 is built as a circuit that changes the select signals "A," "B," and "C" of each LUT circuit 21 included in the memory circuit unit 110 so as to repeat "0" and "1" at a predetermined frequency. The predetermined frequency is, for example, a maximum frequency at which operation is possible (timing can be converged), for example, the frequency of a clock signal given from an external clock. The frequency of the clock signal is 250 [MHz], for example. The predetermined frequency may be the same or may not be the same as the operation clock of the FPGA 100.

As the data update circuit section 121 is activated, the numerical values of the select signals "A," "B," and "C" of the LUT circuit 21 shown in FIG. 3 change between "0" and "1" periodically (e.g., once every four nanoseconds).

The data comparison circuit section 122 monitors output data of each resistor 51 included in the memory circuit unit 110. The data comparison circuit section 122 can be built using an exclusive OR circuit (XOR circuit), for example. The data comparison circuit section 122 inputs output data of the two resistors 51A and 51B set for the memory circuit unit 110 to the XOR circuit and determines whether output data of the XOR circuit is "0" or "1."

Specifically, as shown in FIG. 3, the output data of the resistors 51 (51A and 51B) are determined by data input as the select signals "A," "B," and "C." However, if an error occurs in the bit data indicated by reference sign e1 in FIG. 3 and "1" is inverted to "0," the outputs of the resistors 51 change from "1" to "0."

The data comparison circuit section 122 inputs the same select signal to the two resistors 51A and 51B having the same configuration, and determines whether the output data of the respective resistors 51A and 51B are the same.

Based on the output result of the data comparison circuit section 122, the detection circuit section 123 detects an SEF occurring in the CRAM that forms the memory circuit unit 110. That is, if an SEU occurs in the CRAM forming the CLB 11 or the SM 14 shown in FIG. 2, due to the occurrence of this SEU, the circuit formed by the FPGA 100 fails to operate normally, resulting in the occurrence of an SEF. The detection circuit section 123 detects this SEF.

More specifically, the detection circuit section 123 determines that an SEF has occurred if the output data in the above-described data comparison circuit section 122 is "1." That is, when an XOR circuit is used in the data comparison circuit section 122, as shown in FIG. 3, if the output data of the two resistors 51A and 51B match, the output data of the XOR circuit becomes "0". Alternatively, if the output data do not match, the output data of the XOR circuit becomes "1." Therefore, if the output data of the XOR circuit is "1," it is determined that an SEF has occurred.

Figure 5:
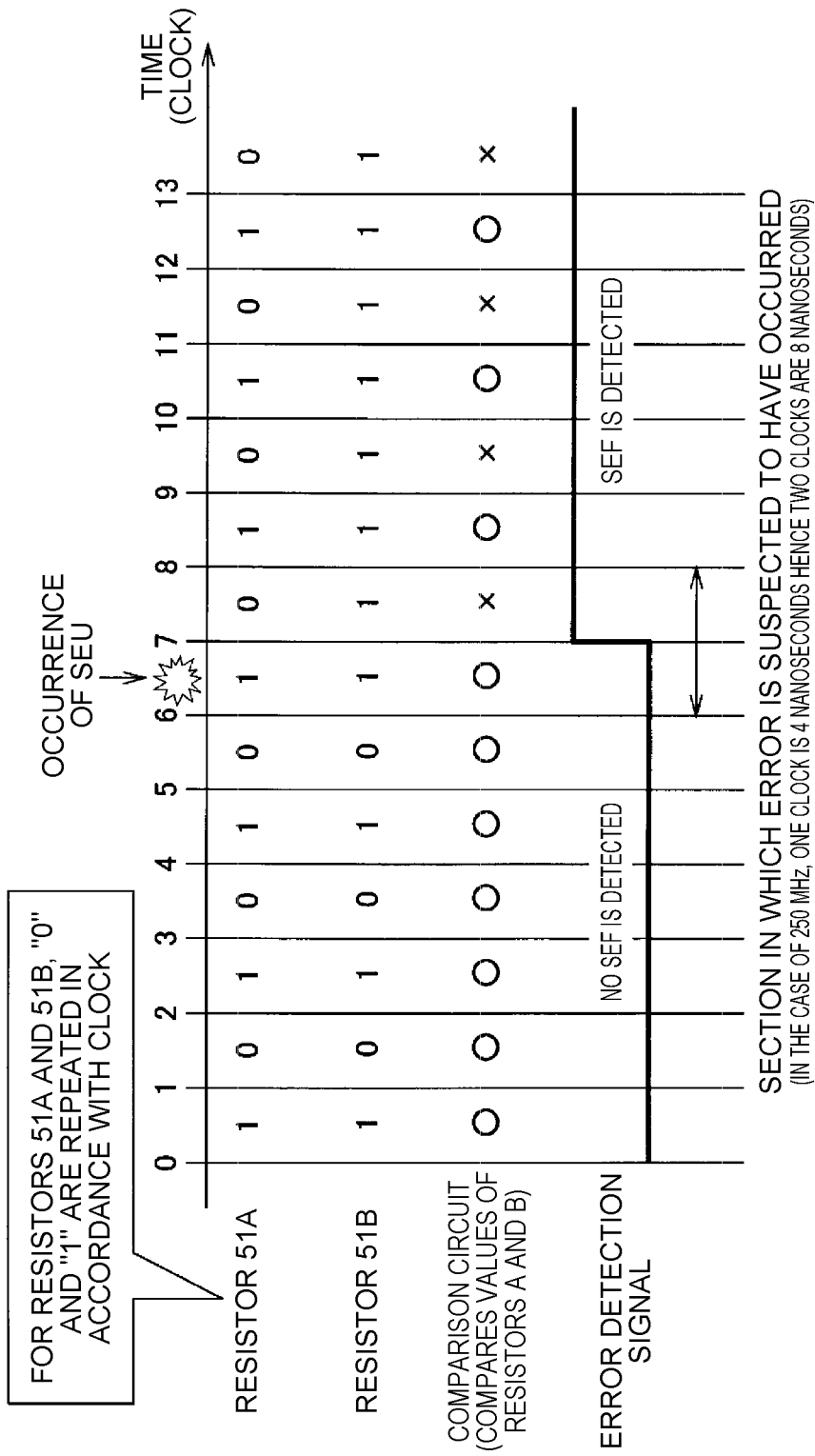
FIG. 5 is a chart showing a process of detecting an SEF occurring in a memory circuit unit by a detection circuit unit.

FIG. 5 is a chart showing a process of detecting an SEF occurring in the memory circuit unit 110 by the detection circuit section 123. In the following, the process of detecting an SEF by means of the detection circuit section 123 will be described with reference to FIG. 5. As described above, the two resistors set in the memory circuit unit 110 will be denoted by 51A and 51B.

The outputs of the respective resistors 51A and 51B are alternately switched between "0" and "1" at the frequency of the clock. If the resistors 51A and 51B are operating normally, the output data of the data comparison circuit section 122 is "0", and therefore no SEF is detected. Meanwhile, if an SEU occurs in the CRAM and an SEF occurs due to the SEU, the output of the resistor 51B is fixed at, for example, "1." As a result, the output data of the data comparison circuit section 122 becomes "1" and therefore an SEF is detected. In this case, if the frequency of the clock is 250 [MHz], as one clock is four nanoseconds, occurrence of an SEF can be detected in eight nanoseconds that correspond to two clocks.

In the example shown in FIG. 5, to simplify the description, the two resistors 51A and 51B included in the memory circuit unit 110 have been described as an example. However, the present invention is not limited thereto and may be configured to detect an SEF using three or more resistors.

If occurrence of an SEF is detected, the detection circuit section 123 outputs a signal indicating occurrence of an SEF to the number-of-errors determination unit 130 and an SEF detection unit 210 which will be described later.

Referring back to FIG. 1, the CRAM monitoring circuit 102 (an error monitoring unit) provided in the FPGA 100 constantly monitors bit errors occurring in the CRAM by using an error check method, such as cyclic redundancy check (CRC). When a bit error occurs in the user circuit 101 formed of the CRAM, the CRAM monitoring circuit 102 detects the address of a region where the bit error has occurred and the bit number of the error, and outputs these pieces of detection information to the number-of-errors determination unit 130.

An error detected by means of an error check method, such as CRC, in the CRAM monitoring circuit 102 will be hereinafter referred to as a "CRAM error" to distinguish it from the above-described "SEF." When a bit error due to an SEU occurs in the CRAM, this bit error does not always cause a logical abnormality (SEF) in the FPGA 100. That is, an error among CRAM errors that causes a logical abnormality in the FPGA 100 is an SEF.

The number-of-errors determination unit 130 determines whether the bit number of the error detected in the CRAM monitoring circuit 102 is one bit or multiple bits. Further, the number-of-errors determination unit 130 distinguishes and detects whether the bit error having occurred in the CRAM is a single-bit upset (SBU) that is an error of one bit or a multi-bit upset (MBU) that is an error of multiple bits.

The number-of-errors determination unit 130 outputs information on the determination result of the bit error (information on an SBU or an MBU) to a number-of-errors identification unit 240 of the nuclear reaction detection device main body 200. Further, the number-of-errors determination unit 130 outputs information on the address of the bit error detected by means of the CRAM monitoring circuit 102 to the number-of-errors identification unit 240.

A process of detecting a CRAM error by means of the CRAM monitoring circuit 102 will be specifically described below. The processing procedure of the method of detecting a CRAM error is different between a case where the FPGA 100 does not have an error correction function of correcting CRAM errors and a case where the FPGA 100 has the error correction function. In the following, each of the case where the FPGA 100 does not have the error correction function for CRAM errors and the case where the FPGA 100 has the error correction function will be described.

[Process when FPGA does not have Error Correction Function for CRAM Errors]

Figure 7:
FIG. 7 is tables showing CRAM errors in a case where the FPGA does not have a function of correcting errors of the CRAM.

In the case where the FPGA 100 does not have the error correction function for CRAM errors, once an error occurs when checking CRAM errors on a fixed cycle by means of an error check method, such as CRC, this error is not corrected. Therefore, this error keeps being detected during the next and subsequent detections. This will be specifically described below with reference to the tables shown in FIG. 7. It is assumed that four errors have occurred in the n-th CRAM error check as shown in FIG. 7(a), for example.

In the example shown in FIG. 7(a), an error of one bit has occurred in an address "0x00000010," with the number of errors "SBU." Similarly, an error of multiple bits has occurred in an address "0x00023000," with the number of errors "MBU." An error of one bit has occurred in an address "0x00100340," with the number of errors "SBU," and an error of multiple bits has occurred in an address "0x09029600," with the number of errors "MBU." A total of four CRAM errors have occurred.

Suppose that, as shown in FIG. 7(b), CRAM errors are detected by means of the detection circuit section 123 in the n+1-th CRAM error check. In the above case, in the n+2-th CRAM error check, due to these CRAM errors, for example, an error of multiple bits occurs in an address "0x00800340," with the number of errors "MBU," as indicated by reference sign Z1 in FIG. 7(c). As shown in FIG. 7(c), other than the error indicated by reference sign Z1, the CRAM errors that have occurred in the past are also detected.

Therefore, the CRAM monitoring circuit 102 determines that errors obtained by omitting the CRAM errors detected in the n+1-th CRAM check, which is the previous check, from the CRAM errors detected in the n+2-th CRAM check are CRAM errors detected in the current check. Specifically, the CRAM monitoring circuit 102 determines that the error indicated by reference sign Z1 in FIG. 7(c) is a CRAM error detected in the current check. As a result, a CRAM error that has occurred in the n+2-th check can be detected, and the address that has caused the SBU or the MBU can be specified.

In other words, suppose that the FPGA 100 does not have the error correction function of correcting bit errors having occurred in the FPGA 100. In the above case, the CRAM monitoring circuit 102 (an error monitoring unit), when detecting bit errors on a fixed cycle, determines that the difference between bit errors in the current detection and bit errors in the previous detection is bit errors detected in the current detection.

[Process when FPGA has Error Correction Function for CRAM Errors]

Figure 8:
FIG. 8 is tables showing CRAM errors in a case where the FPGA has the function of correcting errors of the CRAM.

Meanwhile, in the case where the FPGA 100 has the error correction function for CRAM errors, once an error occurs when checking CRAM errors on a fixed cycle by means of an error check method, such as CRC, this error is corrected. The error that has been once detected is not detected in the next and subsequent CRAM checks. Accordingly, as shown in FIG. 8(a) and FIG. 8(b), no CRAM error is detected in the n-th and n+1-th CRAM checks. If a CRAM error is detected in the n+2-th CRAM check as indicated by reference sign Z2 in FIG. 8(c), this CRAM error can be determined to have occurred in the n+2-th check. It is therefore possible to detect a CRAM error that has occurred in the n+2-th check, and to determine the address that has caused the SBU or the MBU.

That is, in the case where the FPGA 100 has the error correction function of correcting bit errors having occurred in the FPGA 100, the CRAM monitoring circuit 102 (an error monitoring unit), when detecting bit errors on a fixed cycle, determines that bit errors that are detected in each cycle are bit errors that have occurred as of that point in time.

However, when an SEF occurs in the user circuit 101 and immediately thereafter two or more CRAM errors occur, for example, when two or more CRAM errors occur in the n+2-th CRAM check shown in FIG. 8(c), it is not possible to determine which of the two CRAM errors is the CRAM error that causes an SEF. In such a case, these two CRAM errors are not used as data for calculating an SBU cross-section or an MBU cross-section which will be described later.

Next, the configuration of the nuclear reaction detection device main body 200 shown in FIG. 1 will be described. The nuclear reaction detection device 1 according to the present embodiment includes the nuclear reaction detection device main body 200 that is electrically connected to the FPGA 100 and disposed in an environment protected from particle radiation.

The nuclear reaction detection device main body 200 has a timing unit 290 having a function as a timer that measures time, the SEF detection unit 210, the number-of-errors identification unit 240, a particle energy calculation unit 220, and an SEU cross-section calculation unit 230. The SEU cross-section calculation unit 230 includes an SBU cross-section calculation section 231 and an MBU cross-section calculation section 232.

The SEF detection unit 210 acquires information on an SEF output from the detection circuit section 123 of the FPGA 100. When occurrence of an SEF is detected, the SEF detection unit 210 calculates the time of occurrence of the SEF by acquiring the current time measured by the timing unit 290. The SEF detection unit 210 stores information indicating occurrence of an SEF and the time of occurrence of the SEF in predetermined storage means (not shown). Alternatively, the SEF detection unit 210 outputs the information and the time to an external device (not shown).

Figure 6:
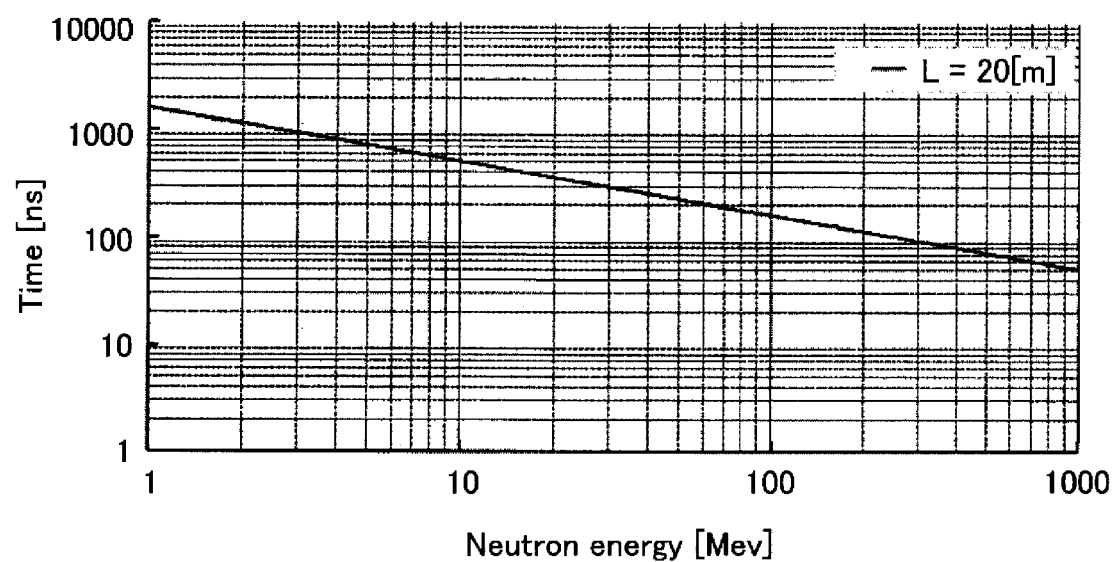
FIG. 6 is a graph showing a relationship between the energy of a neutron and a time of flight of the neutron.

The particle energy calculation unit 220 acquires, from outside, the time at which a particle, such as a neutron, a proton, or a baryon, has been given to the FPGA 100 (a particle generation timing signal). The particle energy calculation unit 220 calculates the differential time between the time of occurrence of the SEF and the time at which the particle has been given to the FPGA 100. Based on this differential time, the particle energy calculation unit 220 calculates the energy of the particle that has caused the SEU in the FPGA 100 that led to the SEF. FIG. 6 is a graph showing a relationship between the energy of a neutron and a time of flight of the neutron. The energy of the particle is calculated based on the graph shown in FIG. 6, for example.

The particle energy calculation unit 220 stores the calculated particle energy in a storage unit (not shown), or outputs the energy to an external device.

The number-of-errors identification unit 240 acquires information on the SEF acquired by the SEF detection unit 210, and information on the number of errors of CRAM errors detected by the number-of-errors determination unit 130, that are the address at which the CRAM error has occurred and information on an SBU or an MBU.

As described above, when an SEU (an SBU or an MBU) occurs in the CRAM, this SEU does not always cause an SEF. Even if an SEU occurs in a CRAM that does not affect circuit operation, malfunction does not occur and no SEF is detected, for example. Specifically, it is known that 5 to 20% of SEUs occurring in a CRAM actually affect the operation of the user circuit 101 shown in FIG. 1.

Based on the SEF acquired by the SEF detection unit 210 and the information on the number of errors detected by the number-of-errors determination unit 130, the number-of-errors identification unit 240 links the SEF to the information on the number of errors that cause the SEF (an SBU or an MBU).

The SBU cross-section calculation section 231 acquires the number of SBUs calculated by the number-of-errors identification unit 240 (which will be denoted by "NS"). The SBU cross-section calculation section 231 acquires, from the particle energy calculation unit 220, the particle fluence (which is assumed to be φ1 [n/cm$^2$]) of particles that constitute a source of occurrence of the SEF linked to each acquired SBU. Then, based on the number of SBUs "NS" and the particle fluence "φ1," the SBU cross-section is calculated by using the following Formula (2):

$$(SBU\ cross\text{-}section) = NS/\phi1 \quad (2)$$

The MBU cross-section calculation section 232 acquires the number of MBUs calculated by the number-of-errors identification unit 240 (which will be denoted by "NM"). The MBU cross-section calculation section 232 acquires, from the particle energy calculation unit 220, the particle fluence (which is assumed to be φ2 [n/cm$^2$]) of particles that constitute a source of occurrence of the SEF linked to each acquired MBU. Then, based on the number of MBUs "NM" and the particle fluence "φ2," the SBU cross-section is calculated by using the following Formula (3):

$$(SBU\ cross\text{-}section) = NM/\phi2 \quad (3)$$

In this way, each of the SBU cross-section and the MBU cross-section can be separately detected.

Description of Effects of the Present Embodiment

In this way, the nuclear reaction detection device 1 according to the present embodiment monitors occurrence of CRAM errors using an error check method, such as CRC, by means of the CRAM monitoring circuit 102 provided in the FPGA 100. When a CRAM error is detected, the address of a region where the CRAM error has occurred is detected. Further, whether the error is an SBU that is an error of one bit or an MBU that is an error of multiple bits is detected. Then, by using the detected SBU and MBU, an SBU cross-section and an MBU cross-section can be separately calculated.

That is, in the conventional technology, only a logical abnormality of the FPGA 100 caused by a bit error of the CRAM is used as an SEU detection trigger. Therefore, it is not possible to identify whether an SEU caused by particle radiation is an SBU in which only one bit is inverted or an MBU in which multiple bits are inverted.

In the present embodiment, an SBU and an MBU can be detected, while being distinguished from each other, by means of the CRAM monitoring circuit 102 that constantly checks data in the CRAM by using an error check method, such as CRC. Therefore, the energy of a particle that has caused the SBU and the energy of a particle that has caused the MBU can be measured while being distinguished from each other. As a result, an SBU cross-session and an MBU cross-session for each continuous particle energy can be measured.

In both the case where the FPGA 100 has the function of correcting CRAM errors and the case where the FPGA 100 does not have the function, the error can be detected by identifying whether the error is the SBU or the MBU.

Further, if a plurality of CRAM errors is detected in one cycle of detection by the CRAM monitoring circuit 102, these CRAM errors are not used for calculation of an SBU cross-section and an MBU cross-section. This can avoid decrease in the calculation accuracy of the cross-sections due to use of uncertain data.

The present invention is not limited to the above embodiment but various modifications can be made within the scope of the gist of the invention.

Figure 9:
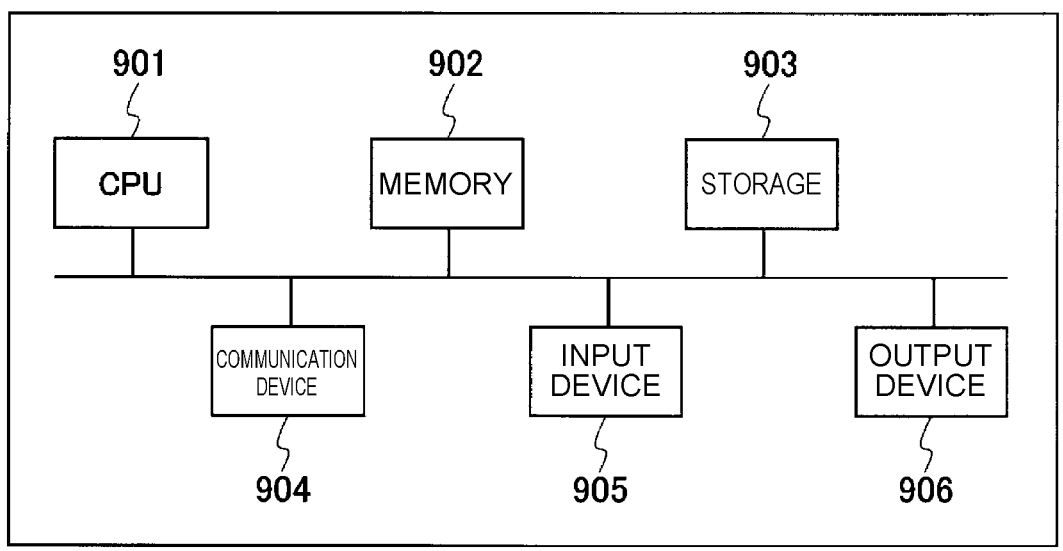
FIG. 9 is a block diagram showing the functional configuration of the nuclear reaction detection device according to the present invention.

For the nuclear reaction detection device 1 of the present embodiment described above, for example, as shown in FIG. 9, a general-purpose computer system can be used which includes a central processing unit (CPU; processor) 901, a memory 902, a storage 903 (a hard disk drive; HDD, a solid-state drive; SSD), a communication device 904, an input device 905, and an output device 906. The memory 902 and the storage 903 are storage devices. In this computer system, each function of the nuclear reaction detection device 1 is realized as the CPU 901 executes a predetermined program loaded on the memory 902.

The nuclear reaction detection device 1 may be implemented using one computer or may be implemented using a plurality of computers. The nuclear reaction detection device 1 may be a virtual machine implemented in a computer.

Programs for the nuclear reaction detection device 1 can be stored in a computer-readable storage medium, such as an HDD, an SSD, a universal serial bus (USB) memory, a compact disc (CD), or a digital versatile disc (DVD), or can be distributed through a network.

REFERENCE SIGNS LIST

1 Nuclear reaction detection device
11 CLB
12 IOB
13 PSB
14 SM
21 LUT circuit
22 FF circuit
51, 51A, 51B Resistor
100 FPGA
101 User circuit
102 CRAM monitoring circuit (error monitoring unit)
110 Memory circuit unit
120 Memory monitoring circuit unit
130 Number-of-errors determination unit (error monitoring unit)
121 Data update circuit section
122 Data comparison circuit section
123 Detection circuit section
200 Nuclear reaction detection device main body
290 Timing unit
210 SEF detection unit
220 Particle energy calculation unit
230 SEU cross-section calculation unit
231 SBU cross-section calculation section
232 MBU cross-section calculation section
240 Number-of-errors identification unit
290 Timing unit
p1 Multiplexer circuit

The invention claimed is:
1. A nuclear reaction detection device having an FPGA, the nuclear reaction detection device comprising:
  a detection circuit that detects an SEF that is an error causing a logical abnormality in the FPGA;
  an error monitoring circuit that detects a bit error occurring in the FPGA, and determines whether the bit error is an SBU that is an error of one bit or an MBU that is an error of multiple bits;
  an SBU cross-section calculation unit, including one or more processors, configured to detect energy of a particle that has caused the SEF, and calculates an SBU cross-section based on the energy and a total number of SBUs that have occurred in the FPGA; and an MBU cross-section calculation unit, including one or more processors, configured to calculate an MBU cross-section based on the energy and a total number of MBUs that have occurred in the FPGA.

2. The nuclear reaction detection device according to claim 1, wherein
in a case where the FPGA does not have an error correction function of correcting bit errors having occurred in the FPGA, the error monitoring circuit, when detecting bit errors on a fixed cycle, is configured to determine that a difference between bit errors in current detection and bit errors in previous detection is bit errors detected in the current detection.

3. The nuclear reaction detection device according to claim 1, wherein
in a case where the FPGA has an error correction function of correcting bit errors having occurred in the FPGA, the error monitoring circuit, when detecting bit errors on a fixed cycle, is configured to determine that bit errors that are detected in each cycle are bit errors that have occurred as of that point in time.

4. The nuclear reaction detection device according to any one of claim 1, wherein
in a case where a plurality of bit errors is detected in one cycle when detecting bit errors on a fixed cycle, the error monitoring circuit does not use the bit errors for calculation of the SBU cross-section and the MBU cross-section.

5. A nuclear reaction detection method performed by a nuclear reaction detection device having an FPGA, the nuclear reaction detection method comprising the steps of:
detecting an SEF that is an error causing a logical abnormality in the FPGA;
detecting a bit error occurring in the FPGA, and determining whether the bit error is an SBU that is an error of one bit or an MBU that is an error of multiple bits;
detecting energy of a particle that has caused the SEF, and calculating an SBU cross-section based on the energy and a total number of SBUs that have occurred in the FPGA; and
calculating an MBU cross-section based on the energy and a total number of MBUs that have occurred in the FPGA.

6. A non-transitory computer-readable storage medium storing a nuclear reaction detection program that causes a computer to function as the nuclear reaction detection device according to claim 1.

* * * * *